(12) United States Patent  (10) Patent No.: US 6,950,681 B2
Hofmann  (45) Date of Patent: Sep. 27, 2005

(54) TRANSMISSION OF DATA BY ULTRASOUND

(75) Inventor: Ludwig Hofmann, Ilmmünster (DE)

(73) Assignee: Siemens Aktiengesellschaft, Munich (DE)

( * ) Notice: Subject to any disclaimer, the term of this patent is extended or adjusted under 35 U.S.C. 154(b) by 458 days.

(21) Appl. No.: 09/751,959

(22) Filed: Dec. 29, 2000

(65) Prior Publication Data

US 2001/0005176 A1 Jun. 28, 2001

Related U.S. Application Data

(63) Continuation of application No. PCT/DE99/01625, filed on Jun. 1, 1999.

(30) Foreign Application Priority Data

Jun. 29, 1998 (DE) .......................................... 198 28 972

(51) Int. Cl.[7] ................................................ H04M 1/00
(52) U.S. Cl. ...................... 455/569.1; 455/74.1; 455/73; 455/550.1; 455/552.1; 341/155; 370/342; 370/441; 375/130; 375/140; 375/146
(58) Field of Search .......................... 455/569.1, 74.1, 455/73, 550.1, 552.1, 557, 566, 550, 552, 567; 341/155; 375/130, 140, 146, 147; 370/342, 441, 320, 335, 352

(56) References Cited

U.S. PATENT DOCUMENTS

| | | | | |
|---|---|---|---|---|
| 4,591,811 A | * | 5/1986 | Nakamura .................. 332/178 |
| 4,969,180 A | * | 11/1990 | Watterson et al. ......... 379/56.1 |
| 5,155,741 A | * | 10/1992 | Waters et al. ............... 375/142 |
| 5,412,620 A | | 5/1995 | Cafarella et al. |
| 5,461,921 A | * | 10/1995 | Papadakis et al. ............ 73/628 |
| 5,721,783 A | * | 2/1998 | Anderson .................... 381/328 |
| 5,938,611 A | * | 8/1999 | Muzilla et al. ............. 600/455 |
| 5,960,367 A | * | 9/1999 | Kita ........................... 455/567 |
| 5,964,706 A | * | 10/1999 | Mo et al. .................... 600/443 |
| 6,006,100 A | * | 12/1999 | Koenck et al. ............. 455/466 |
| 6,130,859 A | * | 10/2000 | Sonnenschein et al. ..... 367/134 |
| 6,272,359 B1 | * | 8/2001 | Kivela et al. ............... 455/567 |
| 6,331,974 B1 | * | 12/2001 | Yang et al. ................. 370/342 |
| 6,522,642 B1 | * | 2/2003 | Scott .......................... 370/342 |

FOREIGN PATENT DOCUMENTS

DE  41 21 195 A1  1/1993
DE  41 21 196 A1  1/1993

* cited by examiner

*Primary Examiner*—Rafael Perez-Gutierrez
*Assistant Examiner*—Khawar Iqbal
(74) *Attorney, Agent, or Firm*—Laurence A. Greenberg; Werner H. Stemer; Ralph E. Locher

(57) ABSTRACT

An ultrasonic transmission system in which, for the purpose of transmission, a signal is used which generates a broadband signal by means of code spreading and is capable of eliminating any echoes by means of correlation. The transmission system exhibits a transmitter and a receiver. In this configuration, digital information is spread to a great bandwidth in accordance with a CDMA technique, D/A converted and then transmitted by means of ultrasound via an air Preferred applications of the present invention are air interfaces having a length of a few meters. One field of application is, for example, the connection of cordless handsets or hands-free telephones to telephones.

6 Claims, 2 Drawing Sheets

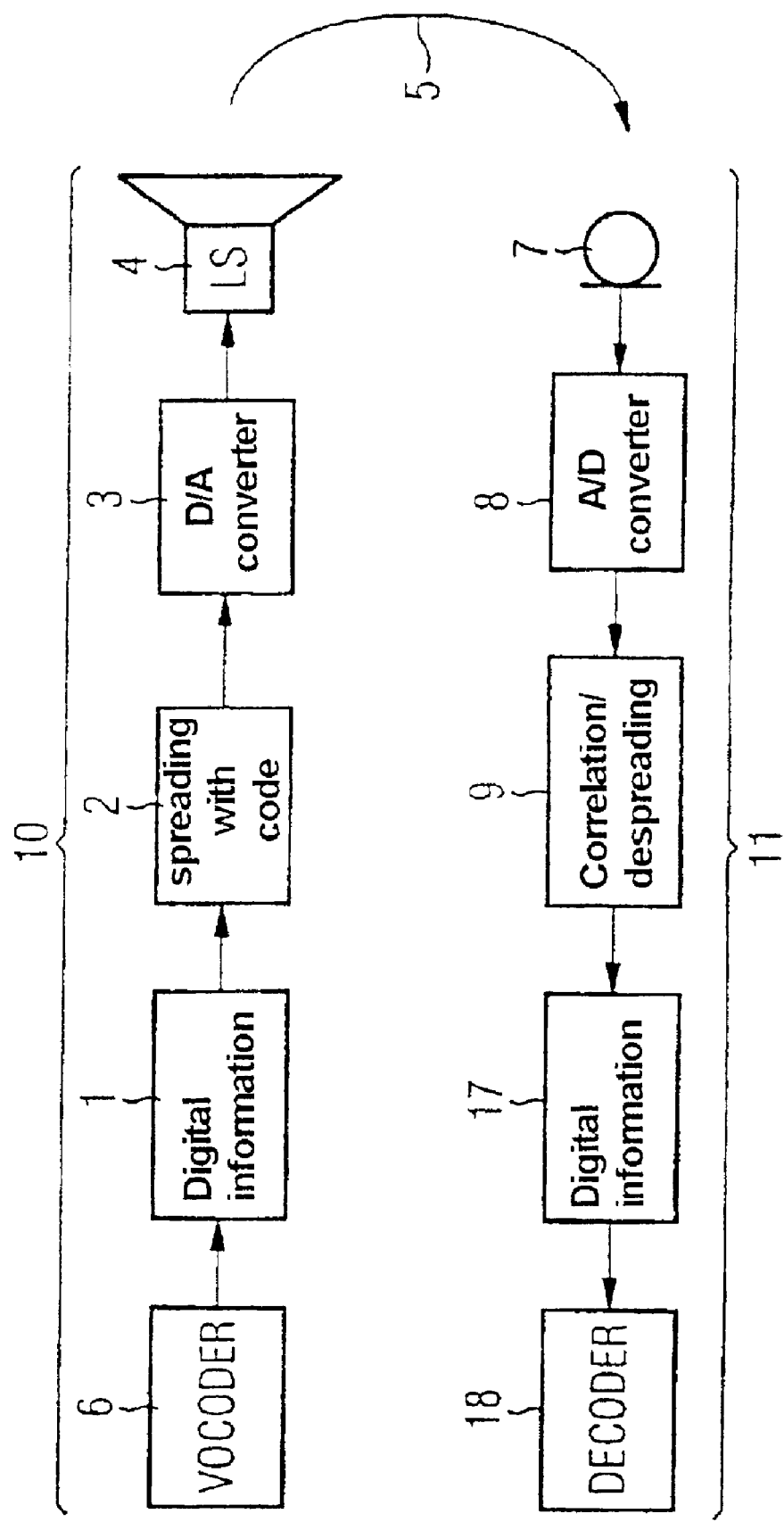

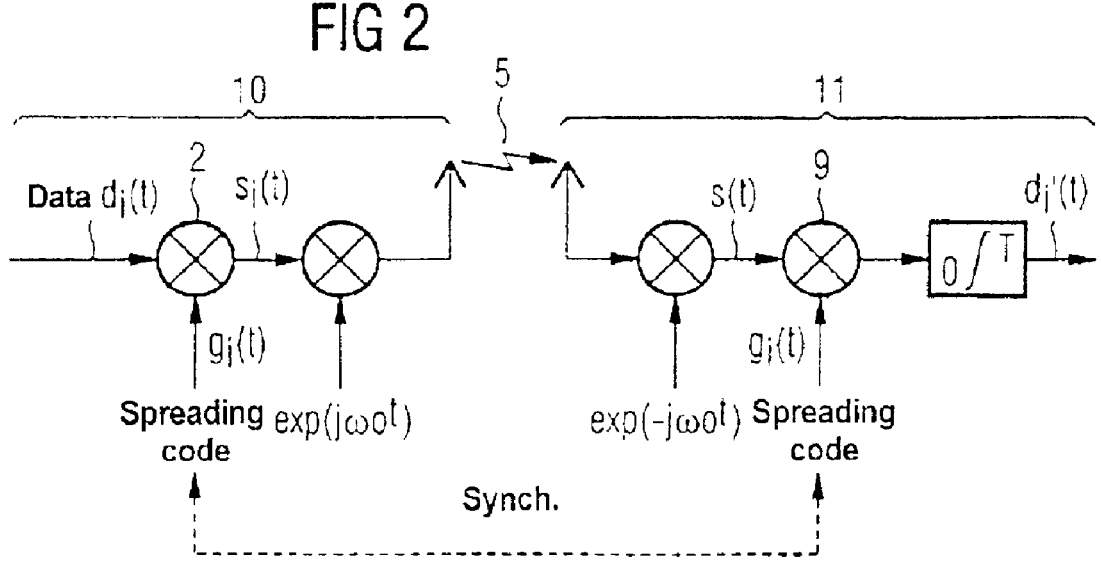
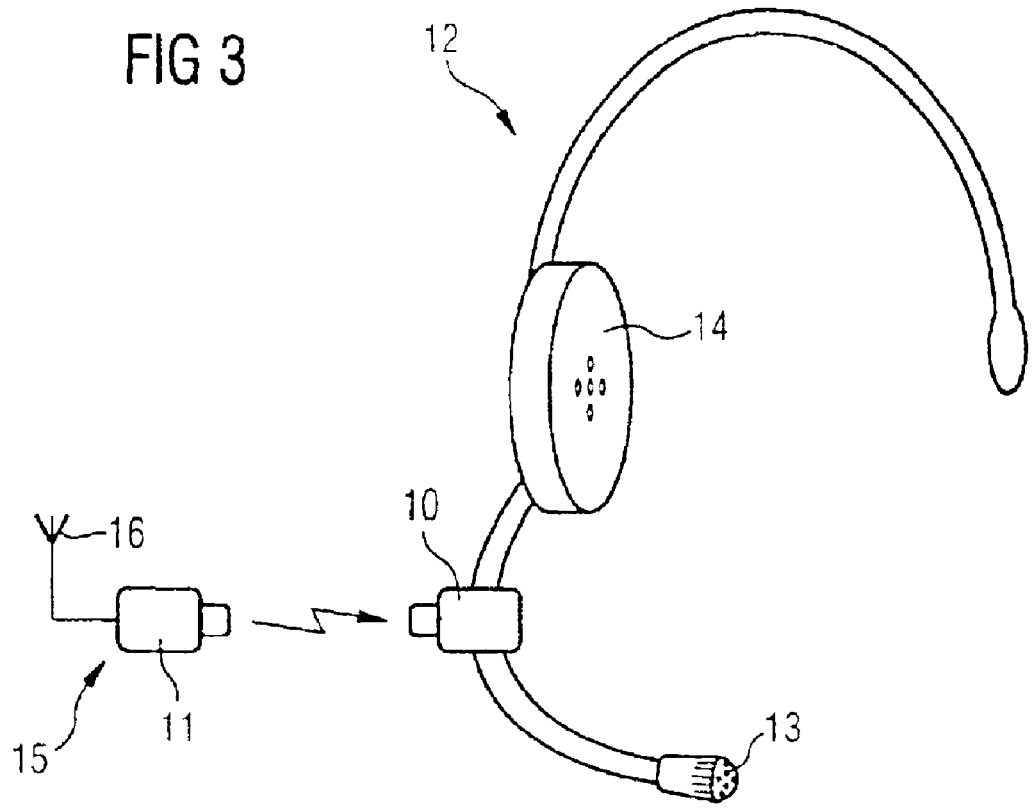

TRANSMISSION OF DATA BY ULTRASOUND

CROSS-REFERENCE TO RELATED APPLICATION

This is a continuation of copending International Application PCT/DE99/01625, filed Jun. 1, 1999, which designated the United States.

BACKGROUND OF THE INVENTION

FIELD OF THE INVENTION

The present invention relates to a method and to a transmission system for transmitting data, such as, for example, digitized voice data, by means of ultrasound via an air interface. The invention also relates to a hands-free telephone which uses such an ultrasonic transmission system.

The invention generally relates to the field of the transmission of data such as, for example, digitized voice data, without a cable. In particular, the invention is directed toward applications that require a transmission range of a few meters. This is the case, for example, when cordless handsets are to be connected to telephones. The air interface in that case typically has a length of, for example, 1–2 m.

From the prior art, various ways of implementing such a wireless transmission over a few meters are known. However, all known techniques have disadvantages. For example, transmission by means of infrared rays is known. Such a transmission can be implemented inexpensively but has the great disadvantage that there must always be a line-of-sight connection between the transmitter and the receiver since otherwise the connection is broken.

Furthermore, transmission via radio (electromagnetic waves) is known. This type of transmission is very complex to implement. In addition, different countries have different regulations so that, as a rule, it is impossible to use a uniform transmission method or a uniform frequency band worldwide. Moreover, interference increases when many transmitters are operating at the same frequency. In particular, this is the case in the so-called ISM (industrial, scientific, medical) frequency bands.

From DE 41 21 196 A1, a handset is known in which a microphone and an earphone are connected to a transmitting and receiving device. In this configuration, the handset can be coupled to a telephone set by means of ultrasound or infrared transmission via a control device.

From U.S. Pat. No. 5,412,620, an apparatus is known which makes it possible to suppress reflections on the surface of the water and on the ground by means of CDMA technology in an underwater transmission system. The distance between transmitter and receiver is from 250 to 500 m. The transmission rate is 625 bps.

In principle, transmission by means of ultrasound is known as a further possibility for transmitting. Transmission by means of ultrasound is known, for example, in its application to remote controls for television sets and has the advantage that it can be produced inexpensively. However, ultrasonic transmission cannot be used for a transmission at higher data rates such as is necessary, for example, for digitized voice, according to the prior art, since the echoes occurring in rooms greatly interfere with the data transmission (multipath effect). Moreover, there are many interference sources such as, for example, switched-mode power supplies which generate interference signals with frequencies in the ultrasonic band and, as a result, can interfere with the actual transmission desired.

SUMMARY OF THE INVENTION

It is accordingly an object of the invention to provide a method for wireless transmission of data that can be implemented inexpensively, that provides a transmission rate necessary for transmitting digitized voice data, and that overcomes the above-mentioned disadvantageous of the prior art methods and apparatus of this general type. It is another object of the invention to provide a transmission system for implementing the method.

With the foregoing and other objects in view there is provided, in accordance with the invention a method for transmitting data between a head part and a base part of a hands-free telephone, which includes: digitizing information to be transmitted; spreading the digitized information over a wider frequency band using a CDMA technique; performing a digital to analog conversion on the spread digitized information; converting the digital to analog converted spread information into an ultrasound signal; and transmitting the ultrasound signal via an air interface.

The central concept of the invention is that, for the transmission, a signal is used which generates a broadband signal by means of coded spreading, and is capable of eliminating any echoes by means of correlation.

According to the invention, a method for transmitting data by means of ultrasound is thus known in which the information to be transmitted, such as, for example, voice or other data, is digitized. The digitized information is then spread, by means of a CDMA (Code Division Multiple Access) technique, over a wider frequency band. The spread information is D/A converted and then converted into an ultrasonic signal. The ultrasonic signal is then transmitted via an air interface.

The information to be transmitted such as, e.g., voice, can be subjected to compression coding before the digitization, especially for reducing the effective bit rate. The compression coding can reduce the effective bit rate, for example, from 64 kbit/s to 1 to 10 kbit/s.

At the receiving end, a received ultrasonic signal is converted into an electrical signal. This signal is then A/D converted and despread in accordance with a CDMA technique. For this purpose, the spreading code used for spreading at the transmitter end is synchronously used.

The transmission can take place at a center frequency between 200 and 400 kHz, the information being spread, for example, to ±100 kHz.

With the foregoing and other objects in view there is provided, in accordance with the invention an ultrasonic transmission system for transmitting, for example, digitized voice. In this configuration, a digitizer digitizes the information to be transmitted. A CDMA spreader (CDMA modulator) spreads the digitized information to be transmitted in accordance with a CDMA technique. A D/A converter converts the spread information and forwards it to an ultrasonic transducer which converts the information to be transmitted into ultrasonic signals. These ultrasonic signals are then transmitted via an air interface.

According to the invention, a hands-free telephone is also provided which exhibits a head part with a microphone and an earphone and a base part. To transmit data between the head part and the base part, an ultrasonic transmission system of the abovementioned type is used.

Other features which are considered as characteristic for the invention are set forth in the appended claims.

Although the invention is illustrated and described herein as embodied in a transmission of data by ultrasound, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows a basic block diagram of the present invention;

FIG. 2 diagrammatically shows the principles of the CDMA technique; and

FIG. 3 shows the application of the present invention to a hands-free telephone.

DESCRIPTION OF THE PREFERRED EMBODIMENTS

Referring now to the figures of the drawing in detail and first, particularly, to FIG. 2 thereof, the CDMA technique used in the present invention will be explained in greater detail.

According to the CDMA (Code Division Multiple Access) technique, all subscribers are simultaneously allowed to utilize the entire available system bandwidth. So that there are no collisions, however, the individual signals are provided with spreading codes which differ in each case and which enable the signals to be unambiguously correlated. The individual signals are spread which multiplies the bandwidth.

As can be seen in FIG. 2, the data to be transmitted $D_{i(t)}$ are first distributed over a greater spectral band by means of a spreading code in a spreading unit 2 in a transmitter 10. After modulation onto a high-frequency carrier, the spread signal is radiated via an antenna to a receiver 11. The receiver 11 receives this signal from its antenna, demodulates it and performs despreading 9 by means of a spreading code which is synchronous with that of the transmitter 10.

However, the receiver 11 receives not only the signal of the desired transmitter 10 but also signals from other transmitters in the same frequency band. Due to the despreading process by means of the corresponding spreading code in the receiver 11, however, only the signal which has the same, synchronous spreading code as the receiver 11 is despread again (see FIG. 2). This makes it possible to suppress interfering influences efficiently.

The CDMA technique can be subdivided into the direct sequence (DS) CDMA technique and the frequency hopping (FH) CDMA technique. In DS CDMA, the data sequence is directly multiplied by the spreading sequence and then modulated. In FH CDMA, the data signal is spread by means of frequency hopping. In this configuration, the carrier frequency of the transmitter 10 is varied in time as a function of the spreading code, i.e. the transmitter 10 and, in synchronism therewith, the receiver 11 change their carrier frequency in accordance with the spreading code (spreading sequence).

The direct sequence (DS) CDMA technique and the frequency hopping (FH) CDMA technique can be used equally in the present invention.

Referring to FIG. 1, the present invention will now be explained in greater detail by means of a block diagram. A compression coder for voice (VOCODER) 6 compresses, for example, voice information of 64 kbit/s to a range of 1 to 10 kbit/s. In the application of the present invention, a data rate of 1 to 10 kbit/s can be easily transmitted by means of ultrasound via an air interface 5. The digital information 1 of the VOCODER 6 is then spread 2 over a greater bandwidth in accordance with a CDMA technique. The output signal of the spreading unit 2 is converted into an analog signal by means of a D/A converter 3 and then converted into ultrasonic signals by means of an ultrasonic loudspeaker 4. The ultrasonic signals are then transmitted to a receiver 11 via an air interface 5.

In principle, the transmission of ultrasonic signals is well known from the prior art so that a description can be omitted.

The receiver 11 receives the transmitted ultrasonic signal, for example by means of an ultrasonic microphone 7. The analog output signal of the ultrasonic microphone 7 is A/D converted 8 and then supplied to a despreader 9. As shown in FIG. 2, a despreading of the signal to a smaller bandwidth is performed in the despreader 9 by means of a spreading code which is synchronous with the transmitter 10. The digital output information 17 of the despreader 9 is then supplied to a decoder 18.

The configuration shown in FIG. 1 has the advantage that it can be implemented inexpensively and can be easily integrated. Attention must be paid to the fact that the length of the air interface is restricted to a few meters, for example 1–2 m, in the preferred application, and thus no high power is required for the transmission.

The air interface 5 advantageously has a length of a few meters. The center frequency of the transmission can be, for example, between 200 and 400 kHz, spreading to ±100 kHz of the data to be transmitted is preferred in this case. Transmission at an ultrasonic frequency of significantly higher than 400 kHz has the disadvantage of severe attenuation and thus of a short range. In addition, attention must be paid to the fact that the attenuation of the ultrasonic signals is a function of the frequency.

FIG. 3 shows a preferred application of the present invention. As already stated, the present invention is particularly suitable for air interfaces having a length of a few meters which is the case, for example, when connecting cordless handsets to telephones. FIG. 3 shows the application of the present invention to a so-called hands-free telephone. This hands-free telephone has a head part 12 and a base part 11. The head part 12, in turn, has an earphone 14, a microphone 13 and a transmitter 10 in accordance with the present invention. The base part 15 can be carried at the hip, for example by means of a belt or a clip. The length of the air interface is thus approx. one meter. The base part 15 exhibits a receiver 11 of the type explained with reference to FIG. 1. For the rest, the base part 15 contains, for example, all remaining components of a known wireless telephone, for example of the GSM standard, and an antenna 16. The actual power amplification thus takes place in the base part 15 as a result of which the components of the head part 12 can be kept small and lightweight. The ultrasonic transmission, in contrast, is used for connecting a cableless handset (head part) to the actual telephone (base part).

According to the present invention, the problems normally occurring with ultrasonic transmission are solved by the fact that a signal which generates a broadband signal due to code spreading and is capable of eliminating any echoes by means of correlation is used for the transmission. The CDMA technique thus suppresses interference, on the one hand due to multipath effect, but also from other transmitters.

I claim:

1. A method for transmitting voice data between a head part and a base part of a hands-free telephone, which comprises:
   compressing information, being the voice data, to be transmitted using compression coding;
   digitizing the compressed information;
   spreading the digitized information over a wider frequency band using a CDMA technique;
   performing a digital to analog conversion on the spread digitized information;
   converting the digital to analog converted spread information into an ultrasound signal;
   transmitting the ultrasound signal via an air interface;
   at a receiver component, receiving the transmitted ultrasound signal and converting the received ultrasonic signal into an analog electrical signal;
   performing an analog to digital conversion on the analog electrical signal;
   despreading the analog to digital converted signal using a CDMA technique; and
   decoding the despread analog to digital converted signal.

2. The method according to claim 1, which comprises reducing an effective bit rate of the information to be transmitted to about 1–10 kbit/s when performing the compression coding.

3. The method according to claim 1, wherein in performing the step of transmitting the ultrasound signal, the ultrasound signal is transmitted at a frequency between 200 and 400 kHz.

4. The method according to claim 1, wherein in performing the step of spreading the digitized information, the digitized information is spread to ±100 kHz.

5. A hands-free telephone comprising an ultrasonic transmission system including:
   a compression coder for compression coding analog information; wherein the analog information is voice data;
   a CDMA spreader for spreading digital information, which is obtained from said coded analog information, to a number of carrier frequencies using a CDMA technique;
   a digital to analog converter for digital to analog converting the spread information;
   an ultrasonic transducer for converting the digital to analog converted spread information into an ultrasound signal and for transmitting the ultrasound signal over an air interface; and
   a receiver including:
   an ultrasonic transducer for receiving the transmitted ultrasound signal and for converting the received ultrasonic signal into an electrical signal;
   an analog to digital converter for analog to digital converting the electrical signal; and
   a CDMA despreader for despreading the analog to digital converted signal using a CDMA technique.

6. The hands-free telephone according to claim 5, wherein said compression coder reduces an effective bit rate to about 1–10 kbit/s.

* * * * *